United States Patent
Domlatil

(10) Patent No.: US 10,631,549 B2
(45) Date of Patent: Apr. 28, 2020

(54) METHOD FOR TYING SAUSAGES IN A STRING OF SAUSAGES

(71) Applicant: Inotec GmbH Maschinenentwicklung Und Vertrieb, Reutlingen (DE)

(72) Inventor: Miroslav Domlatil, Reutlingen (DE)

(73) Assignee: Inotec GmbH Maschinenentwicklung Und Vertrieb, Reutlingen (DE)

( * ) Notice: Subject to any disclaimer, the term of this patent is extended or adjusted under 35 U.S.C. 154(b) by 532 days.

(21) Appl. No.: 15/327,171

(22) PCT Filed: Jul. 13, 2015

(86) PCT No.: PCT/EP2015/065964
§ 371 (c)(1),
(2) Date: Jan. 18, 2017

(87) PCT Pub. No.: WO2016/008841
PCT Pub. Date: Jan. 21, 2016

(65) Prior Publication Data
US 2017/0223973 A1    Aug. 10, 2017

(30) Foreign Application Priority Data
Jul. 18, 2014  (DE) .................. 10 2014 110 153

(51) Int. Cl.
| | |
|---|---|
| *A22C 11/00* | (2006.01) |
| *A22C 11/12* | (2006.01) |
| *G05B 19/416* | (2006.01) |
| *G06K 7/10* | (2006.01) |

(52) U.S. Cl.
CPC ............ *A22C 11/12* (2013.01); *A22C 11/122* (2013.01); *G05B 19/416* (2013.01); *G06K 7/10366* (2013.01); *G05B 2219/37347* (2013.01)

(58) Field of Classification Search
CPC ..... A22C 11/00; A22C 11/02; A22C 11/0209; A22C 11/0218; A22C 11/12
USPC ........... 452/21–26, 30–32, 35–37, 46–48, 51
See application file for complete search history.

(56) References Cited

U.S. PATENT DOCUMENTS

| | | | | |
|---|---|---|---|---|
| 4,541,660 A | * | 9/1985 | Pujol ................... | A22C 11/122 289/2 |
| 5,364,302 A | * | 11/1994 | Shibata ................. | A22C 7/00 452/174 |
| 7,648,411 B2 | * | 1/2010 | Zurwieden ........... | A22C 11/122 452/47 |

(Continued)

FOREIGN PATENT DOCUMENTS

| | | |
|---|---|---|
| DE | 2559171 A1 | 10/1976 |
| DE | 4425233 C1 | 1/1996 |

(Continued)

OTHER PUBLICATIONS

Russian examination report for patent application No. 2016151972/13 dated Sep. 18, 2018.

(Continued)

*Primary Examiner* — Richard T Price, Jr.
(74) *Attorney, Agent, or Firm* — Bachman & LaPointe, PC

(57) ABSTRACT

A method for tying sausages in a rope of sausage using a tying twine supplied from a reel of twine (9) that rotates about the rope of sausage and to which a counterweight (7) is assigned, wherein the counterweight (7) and the reel of twine (9) are adapted to one another when unreeling the tying twine.

14 Claims, 2 Drawing Sheets

(56) References Cited

U.S. PATENT DOCUMENTS

2007/0180793 A1    8/2007   Meyrahn et al.

FOREIGN PATENT DOCUMENTS

| DE | 10115200 A1 | 10/2002 |
| DE | 102005033437 A1 | 2/2007 |
| DE | 202005021188 U1 | 4/2007 |
| EP | 0865732 A1 | 9/1998 |
| EP | 1053683 A2 | 11/2000 |
| EP | 1477068 A1 | 11/2004 |
| EP | 1671545 A1 | 6/2006 |

OTHER PUBLICATIONS

Russian search report for patent application No. 2016151972/13 dated Sep. 18, 2018.
Chinese office action for patent application No. 201580039391.0 dated Sep. 28, 2018.
"Inotec Hochleistungs-Bindeautomat Giromatic IG 5 Inotec Automatic High Speed tying machine Giromatic IG 5", Oct. 12, 2009, XP055210349.
International search report for application No. PCT/EP2015/065964 dated Dec. 9, 2015.

* cited by examiner

METHOD FOR TYING SAUSAGES IN A STRING OF SAUSAGES

BACKGROUND OF THE INVENTION

The invention relates to a method for tying sausages in a rope of sausage using a tying twine supplied from a reel of twine that rotates about the rope of sausage and to which a counterweight is assigned.

In the course of manufacturing sausages in a rope of sausage, it is customary for a sausage meat to be filled by a filling machine via a filling pipe into a tubular packaging sleeve material that is closed off on one side, as a rule being a natural or artificial casing, and then for individual sausages to be formed from this rope of sausage. This takes place, for example, in so-called clipping machines, in which appropriate metal clips are introduced between the sausages, in particular at pre-existing twisting points. Suchlike clipping machines are described, for example, in DE 20 2005 021 188 U1 or DE 10 2005 033 437 A1.

Today, however, the old, traditional tying of sausages by means of a tying twine is being stipulated increasingly. A sausage that is tied with natural tying twine combines product safety and the traditional appearance. The product that has been tied by means of natural tying twine is safe, since no metal or plastic is used in the separation of the portions. The natural tying twine imparts an artisan-made appearance to the product. The procedure is similar to that of the clipping machine, however. Running parallel to the filled casing is a tying twine, which is wound around the casing by the machine once or several times at previously defined, product-related points. It is thus possible for sausages to be tied with or without a spacing between them. Hanging loops can also be integrated, or whole strings of sausages can be formed in the process. A suchlike tying machine is described, for example, in EP 1 053 683 A1.

Having thus been separated and divided into portions, the sausages are then conveyed to the following processing stage for boiling, drying and smoking. This form of portioning or prepacking finds an application wherever either no metal/plastic should be used, or the aim is simply to achieve a traditional artisan-made appearance. Almost all types of sausage with all natural, collagen or artificial casings can be used with this method. There are also various kinds and types of tying twines which are used in this method.

In the tying machines that are present on the market (e.g. the INOTEC Giromatic IG 5 automatic high-speed tying machine), a carrier ring is provided, which is occupied both by a cage, in which a reel of twine is present, and by a counterweight. Said carrier ring rotates about the rope of sausage and, in so doing, wraps the twine around the twisting point in the desired manner. As a result, up to 200 sausages per minute can be tied in high-performance machines. The carrier ring remains stationary between the twisting points, so that the twine is applied along the length of the sausage or the rope of sausage.

These loadings are associated with extremely high vibrations, which cause damage to ball bearings of the rotors or the carrier ring on which the reel of tying twine is supported. Investigations have revealed that, at these speeds—and in particular at the rapid rate of consumption of the tying twine—because of the rapid change in mass of the tying twine rotor, a force arises which causes permanent damage to the ball bearing. Even an already provided counterweight, as is described, for example, as a centrifugal element in EP 1 477 068 A1, is able only to postpone this damage, since the weight of the reel of twine changes on the other side. The counterweight is known to be equivalent approximately to the weight of a housing or a mounting for the reel of tying twine plus half the weight of the reel of tying twine. The reel of tying twine weighs about 150 g. This means that the rotor is perfectly balanced with the reel of tying twine once half of the reel of tying twine has been consumed. An extreme vibration occurs when the reel of tying twine is new or has been used up completely.

A further tying machine is previously disclosed, for example, in DE 25 59 171 C1. This machine is characterized by an opening, through which the meat-filled casing passes, and a device which compresses the casing on the section where tying is envisaged to take place and forces the meat filled into the casing out of this section. Also provided is a spindle or reel, onto which a tying twine is wound. Elements are arranged which feed the reel around a section of the compressed casing and, in so doing, arrange the tying twine in a closed polygon or in a closed curving line in such a way that the reel, at the end of its movement, is able to pass through as it forms a knot. Provided in addition is a device for tightening the tying twine after forming the knot by causing the reel to rotate about its own axis.

SUMMARY OF THE INVENTION

The object of the present invention is to minimize such bearing damage by optimizing the process of tying with the tying twine.

The features disclosed herein lead to the accomplishment of the object.

Fundamental to the invention in this context is the identification of the condition of the reel of tying twine, in particular what percentage of the tying twine has been consumed. As a rule, the adaptation should relate to the decrease in the weight of the reel of twine. This results from the idea that the imbalance occurs as a rule because of the different weights. If this imbalance were to have another cause, the possibility of adapting the counterweight to this other cause is also comprised within the idea of invention.

In one illustrative embodiment of the invention, it is envisaged that a position of the counterweight in relation to the reel of twine is changed. A position of the reel of twine in relation to the counterweight can likewise also be changed. Of course, this also includes monitoring the weight of the reel of twine. This can be accomplished in several different ways. The weight of the reel of twine or the change in the weight can be measured directly by means of appropriate strain gauges or devices for determining the weight.

In another illustrative embodiment of the invention, the thickness of the reel of twine is monitored. This can be accomplished primarily by an appropriate optical system, which establishes the quantity of twine that has been consumed from the reel of twine. The changed weight is calculated from this, and the counterweight is corrected. This can be accomplished with beams of light, for example, which scan the outer periphery of the reel of twine. An appropriate receiver is assigned to a transmitter for light, whereby a light barrier is formed. A number of light barriers preferably constitute a light curtain. Other possibilities are also conceivable in this case, however; for example, the thickness of the reel of twine can be detected by mechanical measuring devices. These other possibilities are also intended to be comprised within the invention.

In another illustrative embodiment, it is also envisaged to determine the length of the tying twine unreeled from the reel of twine, from which it is possible in turn, by being aware of the weight of the tying twine, to deduce the change in the weight of the reel of twine.

A further possibility also involves designing the counterweight as a twine magazine, from which the same or a similar quantity of twine is unreeled during rotation about the rope of sausage. In this way, too, the weight can be kept reasonably constant.

Many possibilities are conceivable for the change in position of the counterweight or the carrier or the cage for the reel of twine. On the one hand, an inclination or a position along a carrier ring could be changed. In a preferred illustrative embodiment, it is sufficient, for example, if a block-like counterweight is caused to rotate about its axis, so that a mass displacement takes place contrary to the axis of rotation. A large number of possibilities are conceivable here, which are intended to be comprised within the present invention.

A change in the material of the counterweight is also conceivable. Materials or material compositions exist, for example, the components of which are displaced during rotation. A material could be selected, for example, of which the heavier, inner components are displaced outwards during rotation and, in so doing, constitute a larger weight. A great deal is conceivable in this case, too.

The present invention ensures that the process of tying sausages with a twine is optimized to the extent that as good as no vibrations are present. This opens up the possibility of achieving an output of even more than 200 portions per minute.

Preferably, data concerning the reel of twine should furthermore be supplied to the machine control system, on the basis of which data unreeling of the tying twine is controlled. These include above all information or data concerning the reel of twine itself and, in particular, concerning the quality of the twine. On the basis of this information, but also primarily on the basis of information concerning the consumption of twine, it is possible, for example, to change the nature of the acceleration of the rotation of the reel of twine about the rope of sausage. An initial position of the reel of twine during starting or slowing down the rotation could also be changed.

A further idea concerns the identification of reels of twine. A machine manufacturer will understandably be eager for suitable material also to be processed on his machine, in the present case suitable tying twines. In order for the machine to operate cleanly and without interruption, said tying twines must exhibit a certain quality, above all in relation to their elasticity, tensile strength and the like. For example, a twine with more adhesive effect (more finishing agent) for salami, and a twine for knackwurst (less finishing agent) are available. There are also differences in how the twine is unreeled. This generally takes place from the inside outwards, although the lead or the nature of the winding is also important. The control of the machine is adapted depending on the quality of the twine. For this reason, it is important to be aware of the quality of the twine and to assign it to the product. There are also products which are capable of being tied cleanly only with the correct quality of twine.

It is envisaged that the reel of tying twine itself has assigned to it an appropriate device, which contains information concerning the reel of twine. This includes the length, age, composition, color, etc. It is thus possible to tell a machine control system whether a suitable tying twine is being used in the process. Of course, it is also possible in this way to ensure that the operator of a special machine is able to purchase the tying twine only from the manufacturer or an authorized distributor, in order to use it on said machine. The entire machine control takes place in real time.

In particular RFID cards or chips and corresponding readers can be considered as storage devices. In this case, too, however, the idea of invention should not be restricted thereto. A suchlike coded storage device is provided for each reel of twine or for a packaging unit for reels of twine (e.g. these may be 108 in number, for reasons of cost, which have a weight of 15-16 kg). When tying with a reel of tying twine is about to start, said storage device must be connected to the machine. It is of secondary importance whether this is done by wire or wirelessly. Both are comprised within the idea of invention. An appropriate reading device is arranged in or on the machine as a rule. Said appropriate storage devices may, of course, also contain information with which a machine is configured in a product-specific manner.

The fact that the twine or, in particular, the quality of the twine has been identified makes it possible to decide what will occur next:
incorrect twine for the selected product
    notification to the customer
    operation with only a reduced output
    operation not possible
correct twine for the selected product
    notification to the customer
    operation at maximum output It is possible, by combining the identification of the quality of the twine and the identification of the actual twine consumption, to control the running characteristics of the carrier ring and to optimize the quality of the tying.

BRIEF DESCRIPTION OF THE FIGURES

Further advantages, characterizing features and details of the invention will become apparent from the following description of preferred illustrative embodiments and also on the basis of the drawing; in the drawing.

DETAILED DESCRIPTION

Figure 2:
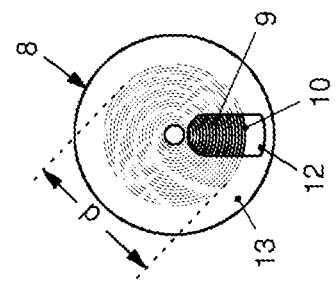
FIG. 2 depicts a view from above of a cage having a reel of twine inserted therein.

Sausages in a rope of sausage, not illustrated here, are fed through an opening 1 in a dynamic component 2 of a displacement shears and then through a tube-like component 3 of the displacement shears. A casing filled with sausage meat is constricted at a specific point by the dynamic component 2 in interaction with the static component 3. How this happens in detail plays only a subordinate role for the present invention. Rotating around the rope of sausage is a carrier ring 4, which is supported in a bearing (not illustrated in more detail) in a machine-based bearing housing 5 of the inventive device, and which rotates in this bearing in the direction of rotation 6.

Figure 1:
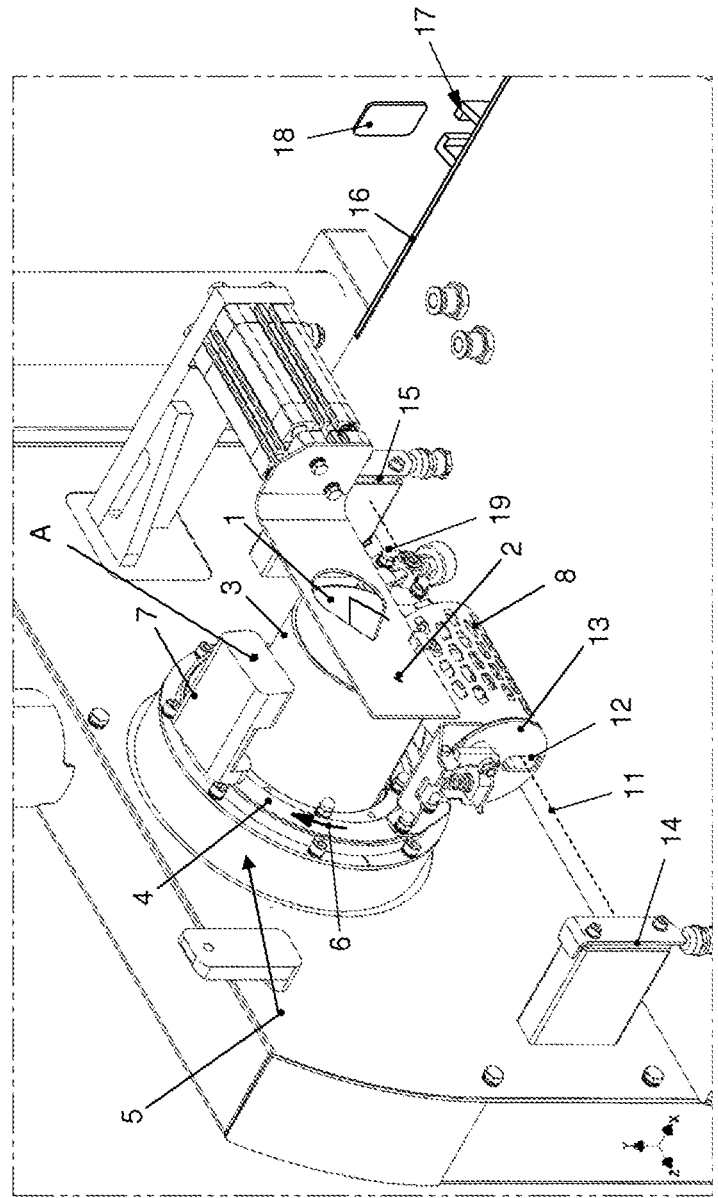
FIG. 1 depicts a perspective view of a detail of an inventive device for tying sausages in a rope of sausage.

A counterweight 7, which rotates together with the carrier ring 4 in the direction of rotation 6, sits on said carrier ring 4. Also present on the carrier ring 4 opposite the counterweight 7 is a cage 8 intended to accommodate a reel of twine 9 represented in FIG. 2. An outer position 10 of the reel of twine 9 is observed by a beam of light 11, represented by a broken line in FIG. 1, through an opening 12 in a cover 13 of the cage 8. Said beam of light 11 can either follow a reduction in a thickness d of the reel of twine 9, or else a number of beams of light 11 are provided as a light curtain, via which a decrease in the thickness d of the reel of twine can be determined.

A light transmitter 14 is provided for transmitting the beam of light 11, and a light receiver 15 is provided for receiving the beams of light.

Figure 3:
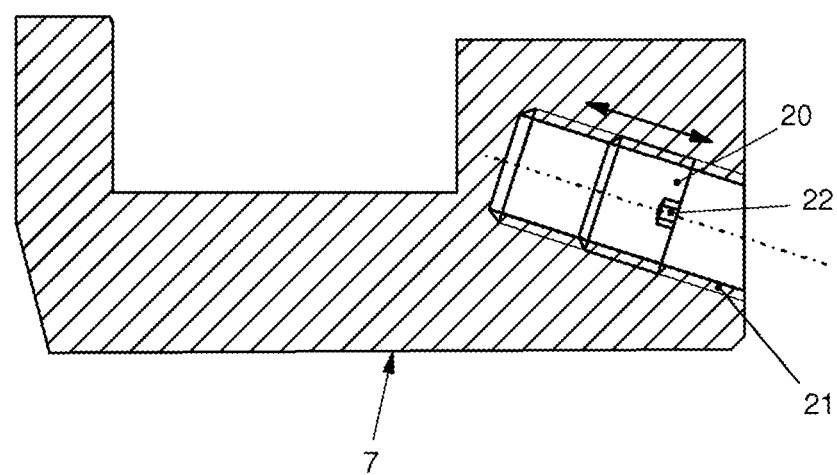
FIG. 3 depicts a cross section through an illustrative embodiment of an inventive counterweight.

An illustrative embodiment of how the counterweight 7 can be changed is depicted in FIG. 3. A threaded screw 20, which is caused to rotate in a tapped hole 21, is present in the counterweight 7 for this purpose. The threaded screw 20 possesses a hexagonal socket 22 for this purpose, into which an appropriate tool is introduced by a small servomotor when stationary (for example for casing replacement), which causes the threaded screw 20 to rotate.

The functionality of the present invention is as follows:

A natural or artificial casing with the appropriate sausage meat is fed through the opening 1 in the dynamic component 2 and the static component 3 of the displacement shears. Individual sausages are produced from this rope by displacing the content of the casing by means of the displacement shears. It is also conceivable for the provision of a tying point also to be accomplished in some other way. What is important, however, is that a spacing without filling material is produced between two sausages (tying point). This tying point (not illustrated here) is wrapped around by a part of the thread by causing the carrier ring 4 to rotate, wherein said twine is guided by a twine guide 19.

Initially (or even later), the counterweight 7 is adapted in respect of its weight to the arrangement of the reel of twine inside the cage, so that the carrier ring 4 runs smoothly and the smallest possible vibrations or no vibrations come about. The weight of the reel of twine 9 decreases, however, when unreeling the tying twine, so that an imbalance arises. This imbalance leads to substantial vibrations, which in turn lead to bearing damage. In order to counteract this, the counterweight 7 is adapted to the change in the reel of twine 9. In the present illustrative embodiment, this is accomplished in that the decrease in the reel of twine 9 is determined by the one or more light beams 11, which scan the outer periphery of the reel of twine 9 through the opening 12 in the cover 13 of the cage 8. According to the invention, the counterweight 7 is adapted continuously or in stages to said decrease in the reel of twine. For example, this can be accomplished by changing the position of the counterweight 7 on the carrier ring 4. Also conceivable is the adjustment of the inclination of the counterweight 7 in relation to the carrier ring 4 more towards the outside or more in the direction of the static component 3 of the displacement shears. A further possibility would involve rotating the counterweight 7 about its axis A, by which the centrifugal force is changed.

Represented on a further side wall 16 of the inventive device, furthermore, is a card reader 17, which is able to read a corresponding storage device 18. The storage device 18 is preferably an RFID card, and the card reader is preferably an RFID card reader. Any data for the reel of twine 9, but above all concerning the quality of the twine, are stored on said storage device 18. The quality of the twine includes details of the weight, the length, the finish and the nature of the winding (lead, positions, etc.). The card reader 17 is connected to the machine control system.

Before the inventive device commences the activity of tying, the machine control system checks the quality of the twine on the reel of twine with reference to the details on the storage device 18. If said details do not correspond to the prescribed characteristics, the tying process will not start or at least an alarm will be given.

It is possible in this way, for example, to indicate to the machine control system what length of a tying twine is present on the appropriate reel of twine 9. If a device, via which the length of the unreeled tying twine is determined, is then assigned to the reel of twine 9, the weight of the reel of twine can also be determined and the counterweight can be controlled from this determination. The machine in turn is designed in such a way that it is only able to operate if an appropriate storage device 18 is inserted into the card reader 17.

This arrangement is intended to ensure that appropriate reels of twine can be sourced only from the machine manufacturer or from a distributor authorized by it. This ensures that only tying twines of a specific quality and with specific characteristics are processed on this machine.

The invention claimed is:

1. A device for tying sausages in a rope of sausage using a tying twine supplied from a reel of twine (9) that rotates about the rope of sausage, and to which a counterweight (7) is assigned, wherein the counterweight (7) is adaptable to a decrease in the reel of twine (9) when unreeling the tying twine.

2. The device as claimed in claim 1, wherein the reel of twine (9) and the counterweight (7) are arranged on a carrier ring (4) rotating about the rope of sausage, said carrier ring being supported in a bearing.

3. The device as claimed in claim 1, wherein weight monitoring is assigned to the reel of twine (9).

4. The device as claimed in claim 1, wherein thickness monitoring is assigned to the reel of twine (9).

5. The device as claimed in claim 4, wherein at least one light source (14) and at least one light receiver (15) is/are assigned to the reel of twine (9).

6. The device as claimed in claim 1, wherein an arrangement for determining the length of the unreeled tying thread is assigned to the reel of twine (9).

7. The device as claimed in claim 1, wherein the reel of twine (9) is arranged in a cage (8).

8. The device as claimed in claim 1, wherein a storage device (18) is assigned to the reel of twine (9), in which storage device data concerning the reel of twine (9) are contained.

9. The device as claimed in claim 8, wherein said storage device (18) is connected to a machine control system.

10. The device as claimed in claim 8, wherein a reading device (17) is provided for the storage device (18).

11. The device as claimed in claim 8, wherein the storage device (18) is an RFID card or chip and/or the reading device is an RFID card reader (17).

12. The device as claimed in claim 1, wherein a storage device (18) is assigned to the reel of twine (9), in which storage device data concerning the reel(s) of twine (9) are contained.

13. The device as claimed in claim 12, wherein the storage device (18) is an RFID chip or card.

14. The device as claimed in claim 12, wherein the data contained in the storage device (18) relate to the quality of the twine, in particular to the weight, the length, the finish and the nature of the reeling.

* * * * *